United States Patent [19]

Mercer

[11] 4,273,023
[45] Jun. 16, 1981

[54] AURAL PITCH RECOGNITION TEACHING DEVICE

[76] Inventor: Stanley L. Mercer, 3038 Alta Vista Ave., Alameda, Calif. 94501

[21] Appl. No.: 106,969

[22] Filed: Dec. 26, 1979

[51] Int. Cl.³ .................... G10G 7/02; G09B 15/02
[52] U.S. Cl. .................................. 84/454; 84/470 R; 328/141; 324/78 D
[58] Field of Search ............... 84/454, 453, DIG. 18, 84/464 R, 470 R, 471 R, 483 R, 483 A; 328/140, 141; 324/79 D, 78 D, 78 Z, 81

[56] References Cited

U.S. PATENT DOCUMENTS

| | | | |
|---|---|---|---|
| 3,351,939 | 11/1967 | Olsen | 324/78 Z |
| 3,886,838 | 6/1975 | Scherrer | 84/484 |
| 4,019,419 | 4/1977 | Yoshikawa | 84/454 |
| 4,198,606 | 4/1980 | Baba | 84/454 |

FOREIGN PATENT DOCUMENTS 1445855 8/1976 United Kingdom ............... 84/454

Primary Examiner—L. T. Hix
Assistant Examiner—S. D. Schreyer
Attorney, Agent, or Firm—Townsend and Townsend

[57] ABSTRACT

Apparatus including amplifier and peak-detecting circuits receives an electrical signal representative of an aural tone containing a pitch to be determined and produces therefrom a pulse train having a pulse reoccurrence frequency (PRF) substantially equal to the pitch of the tone. The pulse-to-pulse period of the pulse train is measured by applying the pulse train to control circuits that alternately enable and disable digital counters clocked by a binary signal of a PRF substantially greater than that of the pulse train. The digital counters produce counts representative of the period of the pulse train which are decoded and applied to a display unit to provide a visual indication of the pitch contained in the received electrical signal.

5 Claims, 9 Drawing Figures

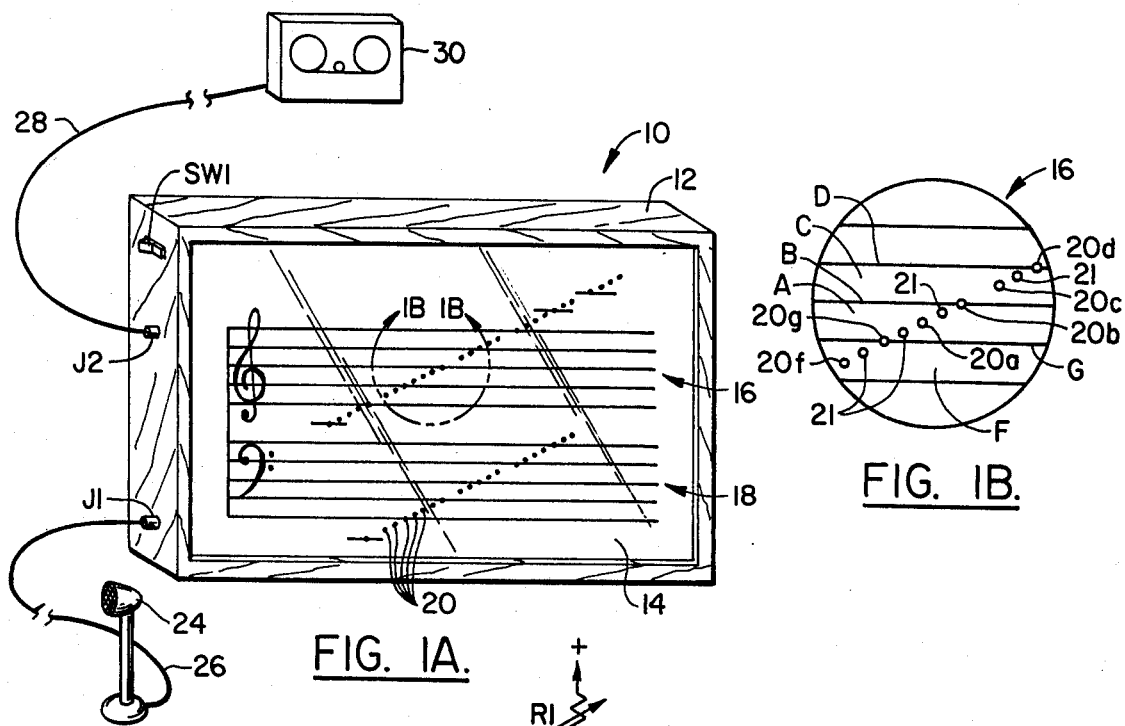
FIG. 1A.
FIG. 1B.
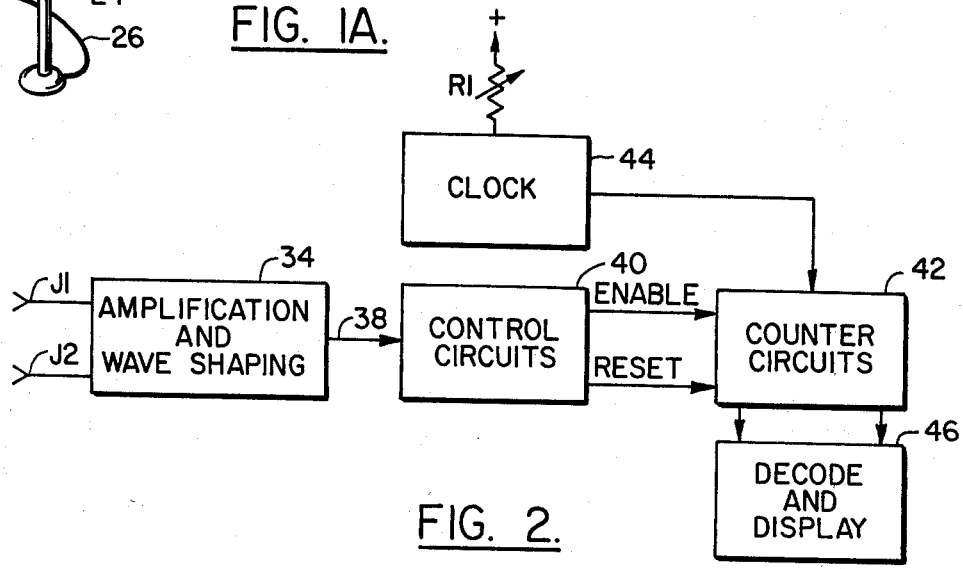
FIG. 2.
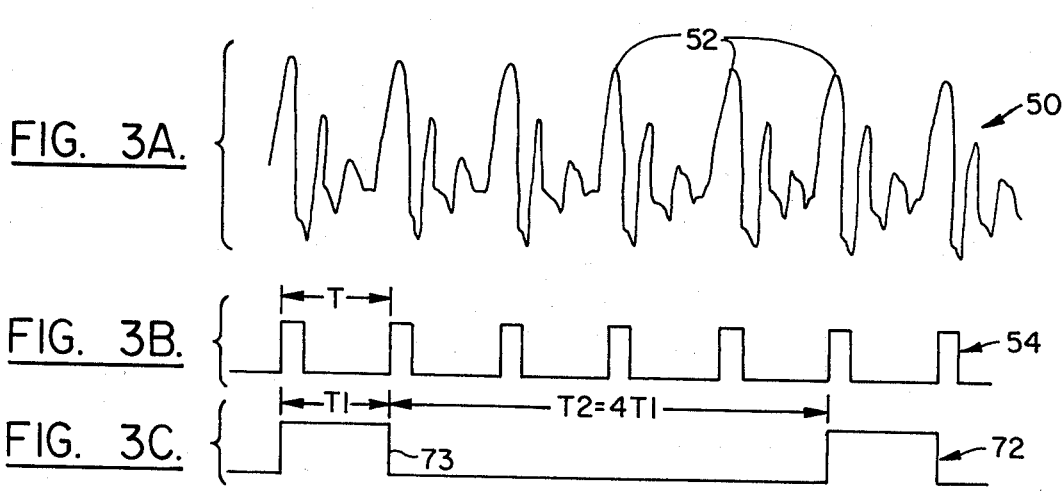
FIG. 3A.
FIG. 3B.
FIG. 3C.

AURAL PITCH RECOGNITION TEACHING DEVICE

The present invention relates generally to a teaching device for assisting voice students in learning recognition and association of the pitch of either an aural or written musical note and more particularly to electronic apparatus for receiving a musical tone and visually reproducing the tone as a musical note.

BACKGROUND OF THE INVENTION

Singers and other vocalists who take the study of the voice with any degree of seriousness, readily recognize three relatively important aspects of voice training: (1) The ability to recognize the written note; (2) the ability to associate the written note with an appropriate musical tone; and (3) the ability to vocally produce a musical tone. This first aspect of voice training requires the student to memorize the notes as they appear on a musical staff. Materials required for learning this first aspect of voice training are minimal: At most, a textbook.

With respect to the latter two of the three above-mentioned aspects, some form of feedback must be provided in order to direct the student's training. For example, a student can be taught to associate the written note with appropriate tones using a musical instrument and the ability to operate that instrument. Similarly, the third above-mentioned aspect of voice training is aided when the student is provided with some form of apparatus that will produce the tone in question, inviting the student to attempt to match the pitch of the musical tone with his or her own voice. Thus, a musical instrument of one form or another and, in the event the student has insufficient knowledge to operate the musical instrument, an instructor is required in order to provide the student with appropriate training. Typically, the student's progress is hastened by having the student listen to a musical tone and then attempting to vocally reproduce the tone in pitch. An instructor reinforces the student's attempts by guiding the student to vary the pitch to match the tone.

There are many devices on the market today available to produce tones to aid the student. Such devices include the various musical instruments (i.e., piano, stringed instruments, pitch pipes and the like) and even some electronic devices. Examples of these latter may be found in U.S. Pat. Nos. 2,888,849, 3,562,934 and 3,886,838.

In addition, this last-mentioned feature of voice training, pitch recognition (i.e., the ability to reproduce and match the pitch of an aural tone), is a sometimes difficult hurdle encountered by voice students in their early stages of training. This aspect of training requires generation of a musical tone having a particular pitch and, by listening to the tone, the student tries to vocally match the tone's pitch. Unless the student is gifted with absolute pitch, it is usually difficult for the student in the early stages of training to accurately match the pitch of the musical tone without some form of guidance. This is due to the fact that the aural tones are perceived differently by the one producing the tones. Thus, guidance in the form of an instructor who directs the student as to how to move his or her voice (i.e., to raise or lower the reproduced pitch) to match the generated musical tone is needed. In absence of such an instructor, the student is left without satisfactory means of practicing pitch recognition on his or her own.

One method heretofore used to determine the pitch of an aural tone has been to apply the aural tone (in the form of an electrical signal) to the beam-deflecting circuits of a cathode ray display tube. A signal of known frequency is also applied to the beam-deflecting circuits of the display tube. By viewing the pattern produced on the display tube a determination can be made as to the frequency content (pitch) of the aural tone. An example of this method can be found in U.S. Pat. No. 2,888,849.

Several problems are attendant with this method, however. The apparatus required to implement the method is costly, complex and cumbersome. More importantly, however, one must be trained to read the figures generated on the display to even come close to determining the information conveyed.

It can be seen, therefore, that a need exists for apparatus that provides the student with positive and accurate feedback for both supervised and unsupervised voice training.

SUMMARY OF THE INVENTION

The present invention meets this need by providing a pitch recognition teaching aid that provides a student with visual information as to the pitch of an aural musical tone produced by the student or any other source. The invention can be inexpensively manufactured, easy to operate and utilizes commercially available digital circuitry that consumes little power during operation, thereby allowing the apparatus of the present invention to be battery-operated.

Broadly, the invention includes input circuitry for converting an aural tone to a binary signal, binary counter circuits for measuring the binary signal and a display for providing a visual indication of the results of the measurement. The input circuitry, including amplification and wave-shaping circuits, receives an electrical signal representative of the arural tone and derives therefrom a digital pulse train having a pulse repetition frequency (PRF) substantially equal to the fundamental frequency (e.g., pitch) of the received tone. The pulse train is applied to control circuits that operate the binary counting circuits. A clock signal, having a predetermined PRF substantially greater than that of the pulse train, is applied to the binary counting circuits to measure the period of the pulse train. The count obtained by the binary counting circuits, which is representative of the fundamental frequency of the received tone, is decoded and applied to display circuits to provide a visual indication of the measurement made.

In the preferred embodiment a musical tone is received in the form of an electrical signal and applied to an amplifier that produces a constant amplitude output waveform. The amplifier output is applied to a peak detector circuit that converts the amplified signal into a binary pulse train having a period equal to the period of the fundamental frequency of the received tone. A pair of sequential pulses of the pulse train is used to define a first control signal that is representative of the period of the pulse train. This first control signal enables a first binary counter circuit to count a 240 KHz clock signal. The count obtained, when decoded, provides a binary representation of the octave of the received tone. A second control signal is developed from immediately succeeding pulses defining four periods of the pulse train and used to enable a second binary counter circuit to count the 240 KHz clock signal. The count thereby obtained, together with the octave determination, is representative of the fundamental frequency of the received tone. These counts are decoded and applied to a display circuit that includes a light-emitting diode (LED) array arranged as written notes on a musical staff. One of the LEDs of the array is activated to provide the student with a visual representation of the pitch of the received tone.

The invention provides a teaching aid having a number of advantages not readily obtained by apparatus presently known. By providing the student with a visual representation of the pitch of a musical tone, learning pitch recognition at the early stages of vocal training without the need of an instructor can be accomplished. As pointed out above, learning pitch recognition by producing a tone from a musical instrument, say a piano, and attempting to vocally match the pitch of the musical tone can be, at times, difficult without some form of guidance. The present invention provides that guidance by providing the student with a visual indication of the pitch produced by the musical instrument, the student, and whether or not a match is obtained. Thus, the student is taught to recognize the pitch of the vocal tones he or she is capable of producing and to associate that pitch with the appropriate written note.

Further, the invention provides apparatus that allows the student to practice pitch recognition, interval training, pitch-note association without the aid of an instructor.

An additional advantage is obtained by the present invention through its use of off-the-shelf digital circuitry which is low-power consuming. This allows the invention to be constructed so that it is battery-operated and portable.

For a fuller understanding of the nature and advantages of the invention, reference should be had to the ensuing detailed description taken in conjunction with the accompanying drawings.

BRIEF DESCRIPTION OF THE DRAWINGS

FIG. 1A is a perspective view of the invention illustrating the display panel used to provide a visual indication of the pitch of the received musical tone;

FIG. 1B is a blown-up view of a portion of the display panel;

FIG. 2 is a simplified block diagram of the electronic circuitry used to implement the invention;

FIGS. 3A-3C are representative waveforms used by the electronic circuitry of the present invention;

DESCRIPTION OF THE PREFERRED EMBODIMENT

Figure 4:
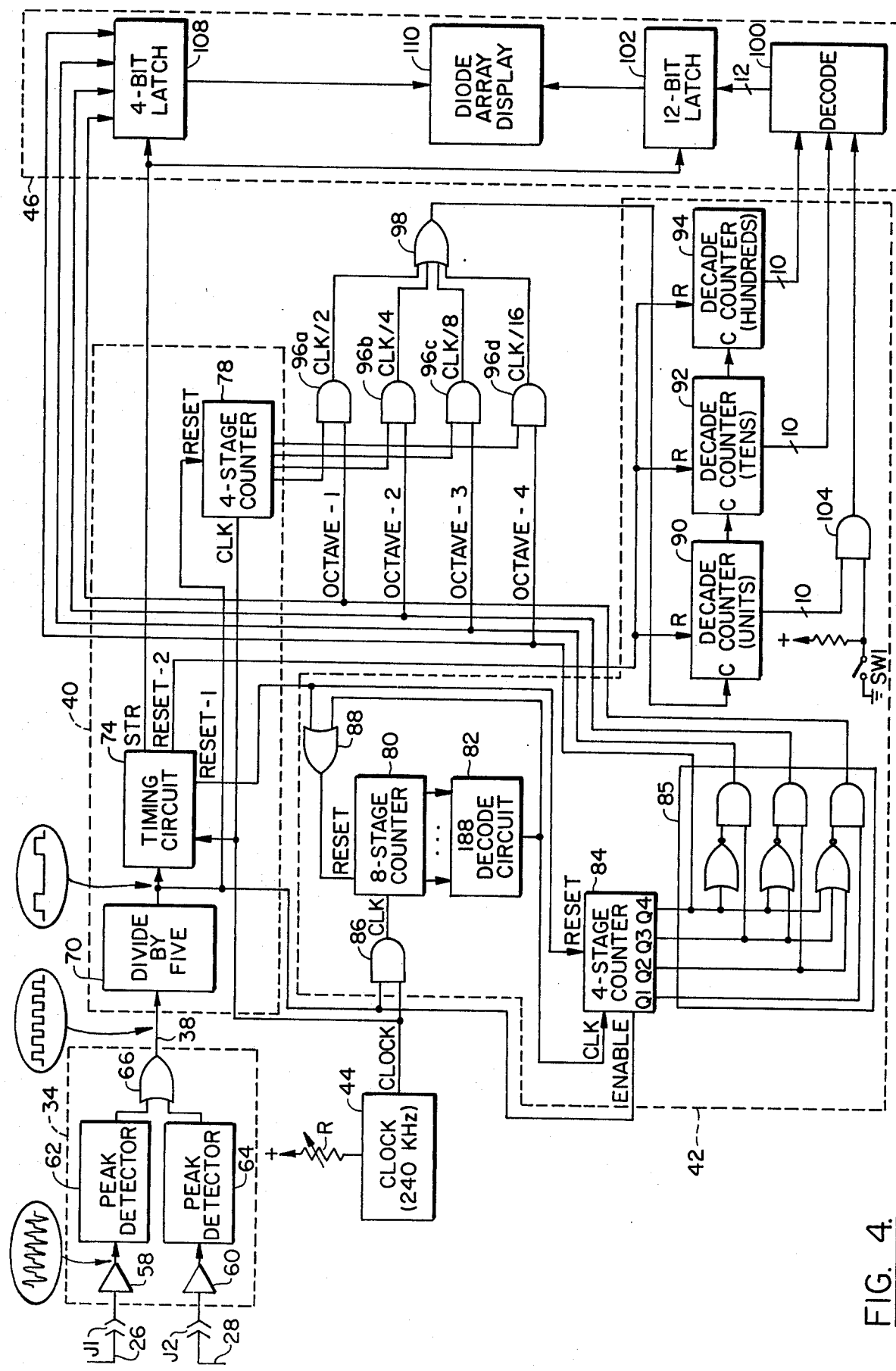
FIG. 4 is a detailed block diagram of the electronic circuitry of the present invention.

Pitch is that psychological property of sound that is characterized by highness or lowness. Within the range of frequencies used in the musical scale, up to about 5,000 Hz, pitch perceptions are noted by a periodicity related to the octave arrangement of the scale. A tone that is doubled in frequency appears to be the same musical note but one octave higher.

A musical tone, such as that produced by a vocalist or a musical instrument of one type or another, is a relatively complex sound generally including a series of harmonics. The pitch of a musical tone, such as one having harmonics of 100, 200, 300 and 400 Hz, is perceived as having a pitch corresponding to the fundamental frequency, 100 Hz. Further, the fundamental frequency of the tone typically has greater amplitude excursions than the other frequencies of the tone. It is this characteristic that is operated on by the present invention. In essence, the present invention receives a musical tone, measures the period (i.e., the time between immediately succeeding amplitude peaks of the fundamental frequency) and translates this measurement to visually displayed information indicative of the pitch of the received musical tone. With these basic concepts in mind, the apparatus of the preferred embodiment will now be described.

Referring to the Figures and particularly FIG. 1A, there is illustrated the pitch recognition device of the present invention, denoted by the reference numeral 10. As illustrated in FIG. 1, the pitch recognition device 10 is housed in a cabinet 12 that has a display face 14 upon which is inscribed the treble clef 16 and bass clef 18 of the musical staff. Mounted in the display face 14, at predetermined locations relative to the respective treble and bass clefs 16 and 18, are light-emitting diodes (LEDs) 20.

Each of the LEDs 20 is located relative to the lines and spaces of the treble and bass clefs 16 and 18 to signify a particular basic or accidental note, as the case may be, when that LED 20 is active. For example, the position of the LED 20g directly on the G line (FIG. 1B) of the musical staff serves to indicate (when active, i.e., lit) that a musical tone received and processed by the pitch recognition device 10 has a pitch of "G". Similarly, the position of LEDs 20b and 20d on lines B and D of the treble clef 16 indicate (when lit) that a received musical tone has the indicated pitch. LEDs 20 located substantially midway from any adjacent pair of the lines forming the treble and bass clefs 16 and 18 provide an indication of a corresponding pitch (e.g., a pitch of F, A, C and E for the treble clef 16 or a pitch of A, C, E or G for the bass clef 18). To indicate an accidental note (such as a b-sharp, f-flat, etc.), certain of the LEDs 20, such as LEDs 21 in FIG. 1B, are located proximate a particular line of the treble clef 16 or bass clef 18. When lit, the particular LED 21 will indicate a note one half-step higher (if located proximate and above a line) or a half-step lower (if proximate and below) the corresponding line's note.

Preferably, the LEDs 20 that indicate pitches of basic notes (such as LEDs 20f, 20g, 20a, 20b, etc.) are of one different color, for example green, while those LEDs 20 indicating accidental notes (such as LEDs 21) are red.

Coupled to the pitch recognition device 10 via input jack J1 is a microphone 24 which receives and converts sound wave to electrical waves. The electrical waves are communicated from the microphone 24 to the pitch recognition device 10 via an electrical cable 26. The pitch recognition device 10 is also adapted to receive musical tones in the form of electrical signals from other sources such as, for example, a conventional tape recorder 30. Thus, an input jack J2 is provided for receiving an electrical cable 28 to electrically interconnect the tape recorder 30 and pitch recognition device 10.

An external switch SW1 is mounted to the cabinet 12 of the pitch recognition device 10. Positionable in one of two positions, the switch SW1 allows one to select whether the pitch recognition device determines a pitch with an accuracy of one-quarter of an interval or an accuracy of three percent of an interval.

Referring now to FIG. 2, there is illustrated a simplified block diagram of the present invention. As illustrated, the invention includes amplification and wave-shaping circuitry 34 for receiving a musical tone in the form of an electrical signal applied to the input jacks J1 or J2 via input lines 36 and 37. An output line 38 couples the amplification and wave-shaping circuits 34 to control circuits 40. The control circuits 40 are, in turn, connected to counter circuits 42 which count a 240 KHz binary signal (CLOCK) provided by a clock 44. The contents (i.e., count) of the counter circuits 42 are applied to a decode and display logic 46 which displays indicia representative of the pitch embodied in the electrical signal (i.e., musical tone) received at the input jacks J1 and J2.

An electrical signal representative of a musical tone has an electrical waveform generally like that illustrated in FIG. 3A and designated by the reference numeral 50. As illustrated, the musical tone waveform is of a somewhat complex nature. However, the fundamental frequency of the musical tone waveform 50, which corresponds to the pitch of the musical tone waveform, is illustrated by the larger equidistant amplitude peaks 52. When applied to the amplification and wave-shaping circuits 34, the amplitude peaks 52 of the musical tone waveform 50 are amplified and applied to wave-shaping circuitry which produces therefrom a pulse train 54 (FIG. 3B) that is substantially equal in frequency to the pitch of the musical tone waveform 50 (i.e., as embodied in the amplitude peaks 52).

The pulse train 54 thus produced is applied to control circuits 40 and used to provide the appropriate control signals to sequentially enable, disable and clear the counter circuits 42. Thereby, the counter circuits 42 count the pulses contained in the CLOCK signal produced by the clock 44, hold a particular count when disabled, and begin counting again after being cleared (i.e., set to an initial state). The effect is to have counter circuits 42 obtain a count that is representative of the period T (FIG. 3B) of the pulse train 54, which, it will be noted, is also the period of the fundamental frequency (i.e., pitch) of the received musical tone waveform 50. It is well known that the reciprocal of the period of a waveform is the frequency of the waveform. Thus, once the period T of the pulse train 54 is obtained, the PRF of the pulse train 54 (i.e., 1/T) can readily be determined by appropriately decoding the contents of the counter circuits. The decoded result is displayed by the decode and display logic 46 by activating the corresponding LEDs 20, thereby providing indicia of the frequency (pitch) of the received musical tone represented by the waveform 50. Preferably, the CLOCK signal provided by clock 44 has a pulse reoccurrence frequency (PRF) substantially greater than that of the pulse train 54. Selection of 240 KHz as the PRF of the CLOCK signal produced by the clock 44 has been found to provide counts that are relatively easy to decode and display. However, it should be evident that CLOCK signal can be of other PRFs. The PRF of the CLOCK signal may be adjusted by, for example, providing the clock 44 with an adjustment mechanism such as variable resistor R1.

Illustrated in FIG. 4 is a more detailed schematic of the circuitry of the present invention. As shown, the amplification and wave-shaping circuits 34 include amplifiers 58 and 60, peak detectors 62 and 64, and OR gate 66. Electrical signals representative of a received or generated musical tone are received at either of the input jacks J1 or J2 and applied to the respective amplifiers 58 and 60. The electrical signal received is amplified and then applied to the peak detectors 62 or 64. The peaks, for example, the amplitude peaks 52 of musical tone waveform 50 (FIG. 3A), are detected by the respective peak detectors 62 or 64 and used to produce a binary signal which cumulatively forms the pulse train 54 (FIG. 3B) that is communicated through the OR gate 66 to the control circuits 40 via the output line 38.

The control circuits 40 include a divide-by-5 counter 70, timing circuit 74 and a four-stage counter 78. The divide-by-5 counter 70 receives the pulse train appearing on the output line 38 to generate therefrom a second pulse train 72 (FIG. 3C). The pulse train 72 has a pulse duration T1 that is substantially equal to the period T of the pulse train 54. Since the pulse train 54 is divided by five, the period (T1+T2) is substantially five times the period T; and it follows T2=4T.

The pulse train 72 generated by the divide-by-5 counter 70 is distributed throughout the system and used as a gating or control signal, as will be discussed. It is also applied to the timing circuit 74 and used, in conjunction with the clock signal produced by the clock 44, to generate the strobe (STR) and reset (RESET-1 and RESET-2) signals that control counter and storing operation, as will be more fully described.

Certain of the signals derived from the pulse train 54 by the control circuits 40 are applied to the counter circuits 42. The counter circuits 42 include an eight-stage counter 80, a 188 decode circuit 82, a four-stage binary counter 84, and decade counters 90, 92 and 94. The eight-stage counter 80 is driven by the CLOCK signal produced by the clock 44 when the pulse 73 of the second pulse train 72 is present at one of the two inputs of the AND gate 86. The output of the eight-stage counter 80 is coupled to the 188 decode circuit 82. The result of the decoding operation is communicated to the clock (CLK) input of the four-stage binary counter 84. The eight-stage counter 80 is cleared by applying to its RESET input the RESET-1 signal produced by timing circuitry 74 or the output of the 188 decode circuit 82 via OR gate 88.

The 188 decode circuit 82 provides a pulse every 188 of the pulses contained in the clock signal provided by the clock 44. The pulses issued by the 188 decode circuit 82 (during the period T1 of the pulse train 72) are counted by the four-stage counter 84. At the end of the T1 period the count obtained by the four-stage counter 84 is decoded by octave decode circuit 85 to provide one of four signals on the signal lines OCTAVE-1, OCTAVE-2, OCTAVE-3 and OCTAVE-4.

The remainder of the counter circuits 42, the three decade counters 90, 92 and 94, are connected in ripple fashion; that is, the carry output ($C_o$) of the decade counter 90 is applied to the clock C input of decade counter 92; and, in similar fashion, the carry $C_o$ output of decade counter 92 is applied to the clock C input of the decade counter 94. The decade counters 90, 92 and 94 are operated by applying to the clock (C) input of the decade counter 90 a signal which is a binary sub-multiple of the clock signal produced by clock 44. Four binary sub-multiples are obtained by applying the clock signal provided by the clock 44 to the four-stage counter 78. An output of each of the four stages of the four-stage counter 78 will produce the clock signal divided by 2, 4, 8 or 16.

Selection of the particular sub-multiple of the clock signal produced by the clock 44 is effected by ANDing the outputs of the octave decoding circuit 85 with a corresponding output of the four-stage counter 78, using AND gates 96a–96d. The selected sub-multiple of the clock signal produced by clock 44 is communicated through the OR gate 98 and applied to the clock (C) input of decade counter 90.

The output of the decade counter 90 is selectively communicated (via a coincidence circuit 104), and the output of decade counters 92 and 94 are directly communicated, to the decode and display logic 46 which is shown in FIG. 4 as including a decode circuit 100, a 12-bit latch 102, a four-bit latch 108 and a diode array display 110. The decode circuit 100 functions to decode the count obtained by the decade counters 90, 92 and 94. The result of the decoding is stored in a 12-bit latch 102 upon receipt of the STR signal generated by the timing circuitry 74 at the end of the T2 period of the pulse train 72 (FIG. 3C). The coincidence circuit 104, which can be implemented using a plurality of AND gates, will communicate the output of the decade counter 90 to the decode circuitry 100 when the resolution switch SW1 is open. If, however, the resolution switch SW1 is closed, the coincidence circuit 104 is disabled, inhibiting communication of the contents of decade counter 90 to the decode circuitry 100. In this latter case, digital "0"s are applied to the decode circuit in place of the output of decade counter 90. The four-bit latch 108 receives and stores the information appearing on the output lines OCTAVE-1 to OCTAVE-4 upon receipt of the STR signal from the timing circuit 74. The contents of the four-bit latch 108, together with the information stored in the 12-bit latch 102, are applied to the diode array 112 and mutually used to activate one of the LEDs 20 to provide a visual indication of the pitch contained in the signal received at the input jacks J1 or J2.

Figure 5:
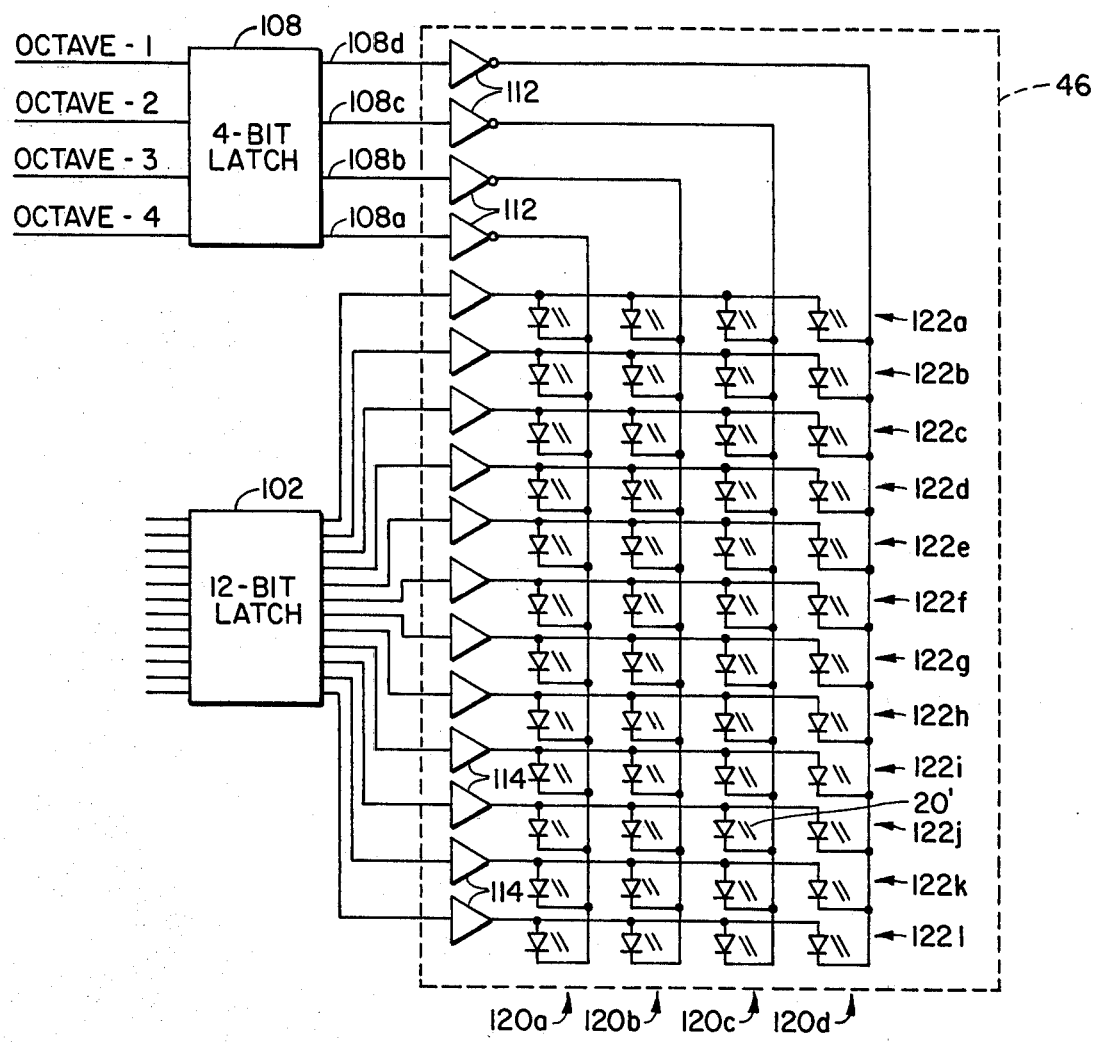
FIG. 5 is a schematic representation of the diode array used to visually display the pitch of a received tone.

The diode array 110 is shown in more detail in FIG. 5. As illustrated, the display itself consists of the LEDs 20, conceptually arranged in columns 120a–120d and rows 122a–122a. The four individual outputs 108a–108d of the four-bit latch 108 are applied to the corresponding cathodes of LEDs 20 in the columns 120a–120d, respectively, via inverting-type display drivers 112a–112d. In similar fashion, each one of the 12 outputs of the 12-bit latch 102 is applied to the anodes of LEDs 20 contained in a corresponding row 122a–122e via non-inverting display drivers 114. In this fashion, any particular LED 20 can be selectively activated by supplying signals to forward-bias an LED 20; that is, the contents stored in the 12-bit latch 102 should cause the anodes of one particular row 122a–122e of LEDs 20 to assume a high voltage while a particular column 120a–120d containing the LED 20 to be selected is placed at a lower voltage (sufficient to forward-bias the selected LED 20) by the contents of the four-bit latch 108. For example, assume that the LED designated by the reference numeral 20' (FIG. 5) is used on display face 14 to, in conjuction with the musical staff (treble and bass clefs 16 and 18), indicate a pitch of middle C. If the electrical signal representative of a musical tone containing a pitch of middle C is applied to one of the amplifiers 58, 60, the contents of the 12-bit latch will ultimately receive and store information that will cause the anodes of the LEDs 20 in row 122j to assume a positive voltage. Similarly, the ultimate contents of the four-bit latch (when inverted by the inverting-type display drivers 112) will cause the cathodes of LEDs 20 in the column 120c to assume a voltage less positive than that applied to the anodes of row 122j (the difference between the two voltages being sufficient to forward-bias the LED 20' and cause it to emit light). It is, of course, evident that the anodes and cathodes of the remaining (non-selected) LEDs 20 in the rows 122a–122i, 122i and 122k and columns 120a, 120b and 120d are maintained at potentials that inhibit forward-biasing the non-selected LEDs 20.

The amplifiers 58 and 60 should be of sufficient gain to separate the amplitude peaks contained in the received signal (FIG. 3A) apart so that the amplitude peaks 52 of the fundamental frequency are predominant. Preferably, amplifiers 58 and 60 are automatic level control circuits implemented by using a compandor such as that manufactured by Signetics Corporation of Sunnyvale, Calif. and having a part number NE570/571. Automatic level control circuits using the NE570/571 are described in detail at pages 794–805 of Signetics Analog Data Manual, published in 1977 by Signetics Corporation.

Figure 6:
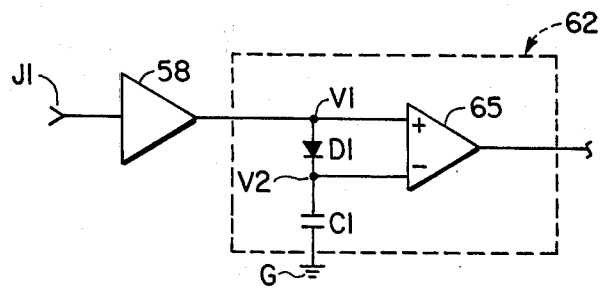
FIG. 6 is a schematic of the amplifying and waveshaping portion of the invention that receives an electrical signal representative of the tone containing a fundamental frequency and derives therefrom the binary pulse train.

The peak detector 62 is illustrated in more detail in FIG. 6. The peak detector 64 is identical in construction to the peak detector 62; thus, the discussion of the circuit of FIG. 6 is understood to apply equally to peak detector 64. As illustrated, the peak detector 62 includes a diode D1, capacitor C2 and comparator 65. The diode D1 is connected across the "plus" and "minus" inputs of the comparator 65; the anode of the diode D1 is connected to the pulse input, and the cathode connected to the minus input. Capacitor C1 couples the minus input of the comparator 65 to system ground G. The output of amplifier 58 connects to the plus input of the comparator 65.

Preferably, the amplified signal provided by amplifier 58 is made unipolar by techniques well known in the art (such as, for example, offsetting the signal produced by amplifier 58 with a D.C. value). Operation of the peak detector 62 then is as follows: When the amplified signal is applied to the peak detector 62, capacitor C1 charges on the positive-going excursions of the signal through diode D1—as long as the instantaneous value of the voltage (V1) of the applied signal exceeds the voltage across the capacitor C1 (V2) by the voltage drop across the diode D1. The capacitor voltage V2 decays exponentially when the voltage V1 is less than the voltage drop across the diode D1 plus the capacitor voltage V2. The time constant of decay is selected so that the capacitor voltage V2 is never less than the amplitudes of the secondary peaks contained in the voltage V1 (less the voltage drop across the diode D1). Computation of this time is well within the skill of those skilled in this art.

So constructed, the output of the comparator 65, and therefore the peak detector 62, will be at one voltage level during the most positive excursion of the applied signal (i.e., amplitude peaks 52). During negative and less positive excursions when V2 is less than V1, the output of the comparator 65 will be at a second voltage level. Thereby, the pulse train 54 is produced.

Referring now to FIGS. 1, 3A–3C, 4 and 5, the operation of the invention can now be described and understood. A musical tone signal in the form of an electrical waveform 50 (FIG. 3A) is applied to the pitch recognition device by a tape recorder 30 or a microphone 24 or both, if desired, in the following manner: Musical tones of predetermined pitches may be recorded on magnetic tape spaced by appropriate pauses. The tape can then be played back by the tape recorder 30 and applied to the pitch recognition device 10. The student plays the tape, hears the tone, and sees the appropriate LED 20 light to indicate the pitch of the recorded tone. The student can then, using the microphone 24, attempt to match the recorded pitch with his own aural production.

In operation, and with particular reference to FIGS. 1, 3A–3C, 4 and 5, an electrical musical tone waveform 10 is received at, for example, the input jack J1 from the microphone 24 and applied to the amplifier 58. The amplified waveform (musical waveform 50—FIG. 3A) is then communicated to peak detector 62 where the highest amplitude peaks 52 of the musical waveform 50 are detected to produce the pulse train 54 (FIG. 3B). The pulse train 54 is communicated via the OR gate 66 and output line 38 to the divide-by-5 circuit 70 to produce the pulse train 72 (FIG. 3C) used for timing and control purposes. As noted above, the pulse train 72 has a pulse duration of T and a total period of 5T, where T is the period of the pulse train 54 as well as the fundamental frequency of the musical waveform 50.

The embodiment of the invention described herein is constructed to determine the pitch contained in an aural tone of the equally-tempered chromatic scale, based on the A of 440 Hz. It will be appreciated by those skilled in this art that minor modifications to the circuitry can allow the present invention to be used for other scales. Here, the chromatic notes are divided into octaves having 12 equal parts. Four octaves are capable of decoding and displaying from a low E of approximately 82.4 Hz to an E flat of 1244.5 Hz. Thus, during the time T1 of the pulse 73 the octave in which the received musical tone resides is determined as follows: The pulse train 74 is applied to AND gate 86 to gate clock signal generated by clock 44 to the eight-stage counter 80. The eight-stage counter 80 is allowed to count until 188 pulses are received and detected by the 188 decode circuit 82. When this event occurs, a signal is generated by the 188 decode circuit 82 and communicated to the clock (CLK) input of the four-stage counter 84. The output of the 188 decode circuit 82 is also applied, via the OR gate 88 to the RESET input of the eight-stage counter 80, resetting the eight-stage counter to a "zero" stage. If time remains (during the period T1) the eight-stage counter 80 then begins once again to count the pulses provided by the clock 44 until 188 pulses are received or the period T1 ends. If the former, the receipt of 188 clock pulses is noted by incrementing the four-stage counter 84, resetting the eight-stage counter 80, and allowing the process to continue until the period T1 ends.

At the end of the period T1, the AND gate 86 and four-stage counter 84 are disabled. It will be remembered that the period T1 is essentially the period T of the pulse train 54 which, in turn, is substantially the period of the fundamental frequency contained in the waveform 50. Thus, the count contained in the four-stage counter 84 effectively represents the number of times the 240 KHz clock signal can be divided during one period of the fundamental frequency of the waveform 50. The pitch recognition device 10 discussed herein is constructed to determine a pitch lying in the range of $E_2$ (approximately 82.5 Hz) to $E_6$ flat (approximately 1245 Hz). Note that by dividing 240 KHz by the 188 figure results in a frequency of approximately 1277 Hz. It can be seen, therefore, that the count contained in the four-stage counter 84 represents the octave in which the pitch to be determined ($f_{pitch}$) and displayed lies. This octave determination is set forth in Table I, below.

TABLE I

| COUNTER 44 CONTENTS | OCTAVE SELECTED |
|---|---|
| 0 | None ($f_{pitch} \geq$ 1277 Hz) |
| 1 | 1 (1277 Hz $\geq f_{pitch} >$ 638 Hz) |
| 2 | 2 (638 Hz $\geq f_{pitch} >$ 319 Hz) |
| 3 | 3 (319 Hz $\geq f_{pitch} >$ 160 Hz) |
| 4 | 4 (150 Hz $\geq f_{pitch} >$ 80 Hz) |
| 5 or greater | None (80 Hz $\geq f_{pitch}$) |

As Table I indicates, if the four-stage counter 84 obtains, at the end of the period T1, a count of 1, 2, 3 or 4, the pitch frequency ($f_{pitch}$) contained in the received musical tone is determined to be within the range of detection of the pitch recognition device 10. Any other count, or no count at all, indicates that the pitch is not within the detectable range of the device. The particular count held in the four-stage counter 84 is decoded by the decode circuitry 85 to produce one of four signals indicative of octave: OCTAVE-1, OCTAVE-2, OCTAVE-3 or OCTAVE-4.

The eight-stage and four-stage counters are reset prior to the next pulse 73 in time by a RESET-1 signal generated by the timing circuit 74 at the start of the next pulse 73. Note that in time, the signal applied to the RESET-1 line should follow the signal applied to the STR line so that the decoded contents of the four-stage counter 84 can be stored in the four-bit latch 108 and used while another pitch determination is being made. During period T2 of the pulse train 72, the frequency of the pitch is determined in the following manner: The 240 KHz clock signal produced by clock 44 is applied to the four-stage binary counter 78 which had been held in a reset condition during the period T1. After the period T1 ends and during the period T2, the four-stage counter 78 is allowed to count, in effect functioning as a frequency divider. The least significant stage of the four-stage counter 78 divides the CLOCK signal by two. Similarly, the succeeding stages of the four-stage counter 78 divide the CLOCK signal by four, eight and sixteen, respectively. The four output lines of the four-stage counter 78 are applied to AND gates 96a–96d. The respective signal lines OCTAVE-1 to OCTAVE-4 from the octave decoder 85 are also individually applied to the AND gates 96a–96d to select one of the divisions of the CLOCK signal. Thus, for example, if during the time period T1 it has been determined that the pitch contained in the received musical tone lies within the first octave (see Table I, above) the OCTAVE-1 will enable the AND gate 96a, the remaining AND gates 96b–96d being disabled; and the divided CLOCK signal, CLK/2, will be applied to the decade counters 90, 92, 94 via the OR gate 98.

At the end of the period T2, the count contained in the decade counters 90, 92 and 94 is decoded by the decode circuit 100 and applied to the 12-bit latch 102 where it is stored upon receipt of the STR signal produced by the timing circuit 74. At the same time, the output signals OCTAVE-1 to OCTAVE-4 produced by the octave decode circuitry 85 are also stored in the four-bit latch 108 by the STR signal. Immediately following the STR signal in time are the RESET-1 and RESET-2 signals produced by the timing circuit 74. The former clears the eight-stage counter 80 and four-stage counter 84 as described above. The latter is applied to the reset (R) inputs of the decade counters 90, 92 and 94 to clear them.

The contents of the twelve and four-bit latches 102 and 108, respectively, form a digital representation that is indicative of the pitch frequency of the received musical tone. This digital representation undergoes a final decoding by the diode array 110, as hereinbefore explained, to activate one (and only one) of the LEDs 20 to provide one with a visual representation of the determined pitch.

In summary, there has been described a pitch recognition device 10 that can receive an aural musical tone signal from a microphone 24 or a tape recorder 30 or like device and determine therefrom the pitch contained in the received musical tone. Thus, a voice student can use the pitch detection device 10 to practice pitch recognition by a number of methods. The student can sing a musical tone and determine the pitch of that tone relative to a musical staff; he or she can listen to a musical tone produced, for example, by playback of a prerecorded tape via the tape recorder 30 and attempt to match the tone.

While the above provides a full and complete disclosure of the preferred embodiment of the invention, various modifications, alternate constructions and equivalents may be employed without departing from the true spirit and scope of the invention. For example, the range of pitches that can be determined by the pitch recognition device 10 can be expanded by comparable expansions of the counter circuit, decode and display circuitry. Therefore, the above description and illustrations should not be construed as limiting the scope of the invention which is defined by the appended claims.

I claim:

1. Apparatus for teaching aural pitch recognition by receiving a musical tone containing a pitch in the form of peak amplitude excursions and by displaying a visual represenation of the pitch, comprising:
   means for receiving and detecting the peak amplitude, and for generating therefrom a pulse train having a period and a pulse repetition frequency substantially equal to that of the pitch;
   means coupled to the receiving means and responsive to the pulse train for producing therefrom a periodic control signal having a first binary state followed by a second binary state, said control signal having a period substantially equal to a number of said pulse train periods;
   means for producing a binary clock signal having a predetermined pulse repetition frequency substantially greater than that of said pulse train;
   first counter means operatively coupled to the control means and responsive to the first binary state of said control signal for receiving and counting the binary clock signal during a time duration of said first state to produce therefrom a first count representative of the octave of the pitch;
   second counter means operatively coupled to the clock means and responsive to said second binary state and said first count, and for producing a second count indicative of the frequency of said pitch within the octave; and
   means coupled to said first and second counter means for receiving the first and second count and for decoding and displaying therefrom a visual representation indicative of the pitch of the received musical tone.

2. The apparatus of claim 1, wherein the display means includes a face plate element having indicia representative of a musical staff; and a plurality of light-emitting diodes each corresponding to a predetermined pitch, the light-emitting diodes being mounted on the face plate at locations relative to the musical staff indicia to correspond to the predetermined pitch of the respective one of the light-emitting diodes.

3. The apparatus of claim 2, wherein the decoding means includes electrically arranging and connecting the plurality of light-emitting diodes in a matrix of N rows and M columns; the decoding means being adapted to couple a first portion of the data word to the N rows of the matrix and a second portion of the data word to the M columns of the matrix to cause a one of the light-emitting diodes to become active.

4. A teaching aid for providing a voice student with a visual representation of a pitch contained in a musical tone, the teaching aid comprising:
   means for producing an electrical signal representative of the musical tone;
   means for receiving and amplifying the electrical signal;
   means coupled to the receiving means for detecting amplitude peaks of the amplified electrical signal and for producing therefrom a pulse train having a pulse-to-pulse period substantially equal to a period of the pitch contained in the musical tone;
   means coupled to said peak detecting means for receiving the pulse train and for producing therefrom at least first and second control signals each having time durations substantially equal to R times the pulse-to-pulse period of said pulse train, R being an integer greater than zero;
   means for generating a first clock signal having a predetermined frequency substantially greater than that of the pitch contained in the musical tone;
   means coupled to said clock means and responsive to said first control signal for producing a data word indicative of the octave of said pitch;
   means coupled to said clock means for producing a plurality of second clock signals that are each different submultiples of said first clock signal;
   means coupled to said second clock signal producing means and responsive to said data word for selecting a one of said second clock signals;
   means responsive to said second control signal for receiving and counting said selected second clock signal to produce therefrom a count indicative of a fundamental frequency of said pitch; and
   means responsive to the data word and the count for producing therefrom and displaying the visual representation of the pitch contained in said musical tone.

5. The teaching aid of claim 4, wherein the detecting means includes a comparator means having first and second inputs and an output, a diode connected between the first and second inputs and a capacitor connected between the second input and a system ground; and means for applying the amplified electrical signal to the first input, the pulse train appearing on the output of the comparator.

* * * * *